United States Patent
Hartmann et al.

(10) Patent No.: US 7,681,396 B2
(45) Date of Patent: Mar. 23, 2010

(54) STEAM TURBINE WITH HEATING STEAM EXTRACTION AND POWER PLANT WITH STEAM TURBINE

(75) Inventors: Dirk Hartmann, Muehlhausen (DE); Franz-Josef Hoely, Hemsbach (DE)

(73) Assignee: ALSTOM Technology Ltd., Baden (CH)

( * ) Notice: Subject to any disclaimer, the term of this patent is extended or adjusted under 35 U.S.C. 154(b) by 171 days.

(21) Appl. No.: 11/773,590

(22) Filed: Jul. 5, 2007

(65) Prior Publication Data
US 2008/0010968 A1    Jan. 17, 2008

(30) Foreign Application Priority Data
Jul. 17, 2006   (CH) .................................. 1146/06

(51) Int. Cl.
*F01K 7/34*    (2006.01)
(52) U.S. Cl. .......................................... 60/653; 60/679
(58) Field of Classification Search ............... 60/653, 60/677–680
See application file for complete search history.

(56) References Cited

U.S. PATENT DOCUMENTS 2,918,909 A * 12/1959 Nickel .......................... 122/1 B
4,492,084 A *  1/1985 Spliethoff .................... 60/648
4,550,569 A * 11/1985 Isa et al. ....................... 60/657
4,628,693 A    12/1986 Riollet
4,873,827 A    10/1989 Hadano et al.

FOREIGN PATENT DOCUMENTS

DE    1049875    2/1959
JP    58-57010    4/1983
JP    58-98605    6/1983

OTHER PUBLICATIONS

Search Report for Swiss Patent App. No. 1146/06 (Apr. 27, 2007).

* cited by examiner

*Primary Examiner*—Hoang M Nguyen
(74) *Attorney, Agent, or Firm*—Cermak Kenealy Valdya & Nakajima LLP; Adam J. Cermak

(57) ABSTRACT

A steam turbine (10) with heating steam extraction includes a plurality of turbine sections (11, 12, 15, 17, 19, 20) for the high pressure, medium pressure and low pressure ranges, which turbine sections (11, 12, 15, 17, 19, 20) are arranged in each case in a separate casing and connected by a common shaft (28), and which includes one high pressure turbine (11), at least one subsequent medium pressure turbine (15, 17), which is connected on the outlet side to two series-connected heaters (21, 24) of a district heating circuit (27), and one subsequent low pressure turbine (19, 20). Safe control of high volumetric flows of steam is achieved by providing, for heating steam extraction, two medium pressure turbines (15, 17), which operate in parallel, in separate casings, and which are connected on the outlet side in each case to one of the heaters (21, 24).

8 Claims, 1 Drawing Sheet

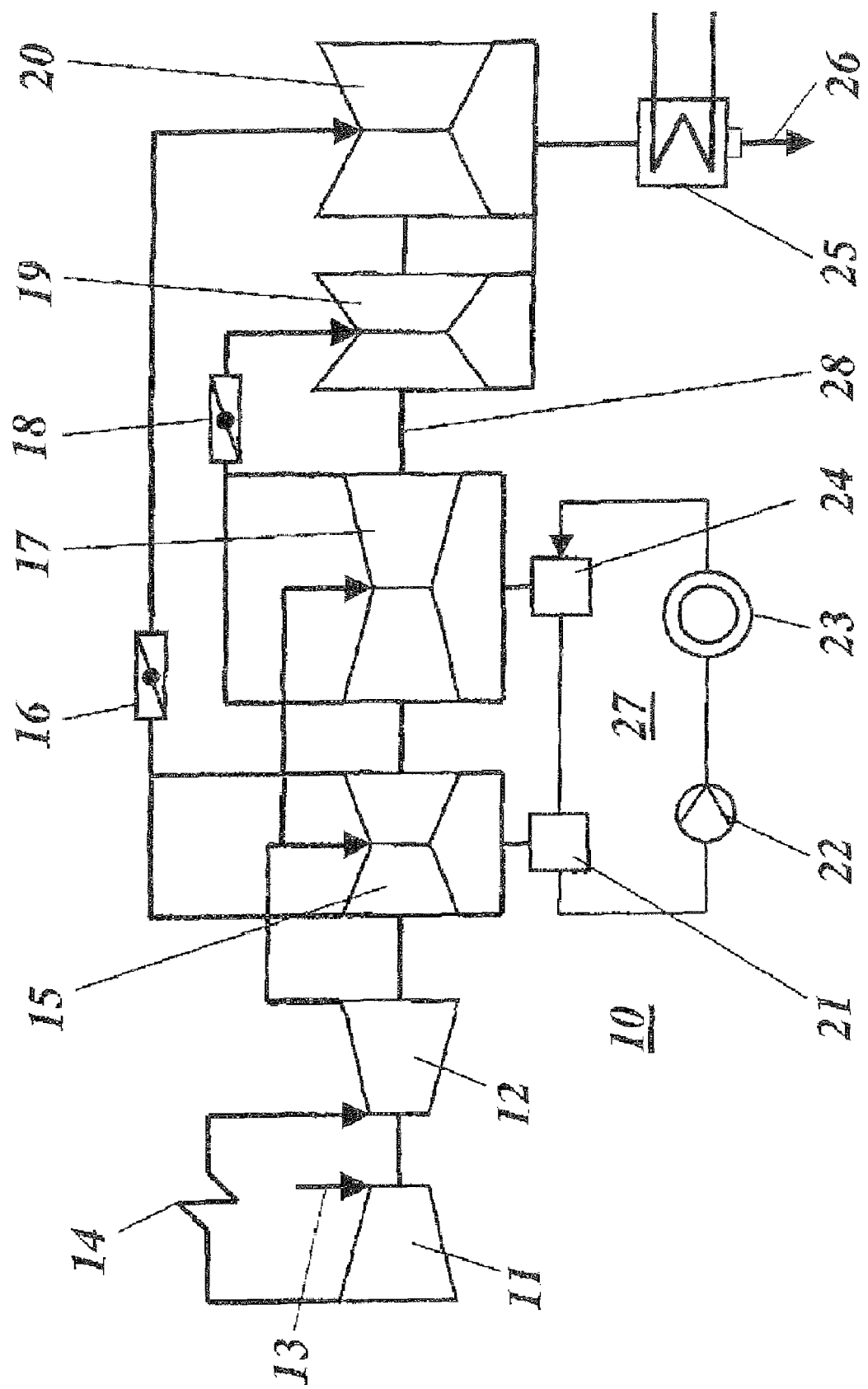

STEAM TURBINE WITH HEATING STEAM EXTRACTION AND POWER PLANT WITH STEAM TURBINE

This application claims priority under 35 U.S.C. § 119 to Swiss application number 01146/06, filed 17 Jul. 2006, the entirety of which is incorporated by reference herein.

BACKGROUND

1. Field of Endeavor

The present invention relates to the field of steam turbines, and to a steam turbine with heating steam extraction.

2. Brief Description of the Related Art

Heating heat decoupling from condensing turbines is a current measure for district heat generation. With this, in most cases the heating steam is decoupled from the tappings of the low pressure turbine, in order to achieve an energetically optimum solution at a low temperature level.

With large heating output and, as a result of it, large steam extraction volumes, the tapping slots and branches of the low pressure turbine have a limiting effect so that special medium pressure turbine sections for heating steam extraction are necessary. Such a solution is already known from U.S. Pat. No. 4,628,693.

In steam turbines with very high electrical power output (for example >500 MW) and at the same time very high heating heat generation with low flow temperatures and return temperatures, the volumetric flows of steam which are to be decoupled are no longer controllable by the previous concepts. For modern steam turbine processes, high reheater pressures and reheater temperatures are also necessary, so that the expansion to the very low pressure level of the heaters which are arranged in the district heating circuit has to be distributed not in one but in two series-connected MP turbines.

SUMMARY

One of numerous aspects of the present invention involves a steam turbine with which, in a simple manner, high volumetric flows of the heating steam can be safely controlled.

According to another aspect of the present invention, for heating steam extraction, two medium pressure turbines, which operate in parallel, are provided in separate casings and are connected on the outlet side in each case to one of the heaters. By the use of two medium pressure heating turbines with large outlet branches which are connected to the heaters of the district heating circuit, large volumetric flows can be controlled.

A further aspect includes that the two medium pressure turbines are formed, in each case, in double-flow configuration.

Another aspect includes that the two medium pressure turbines communicate with each other on the inlet side, that the first medium pressure turbine expands the steam to a first pressure, that the second medium pressure turbine expands the steam to a second pressure which is lower than the first pressure, and that the first medium pressure turbine is connected to the second heater of the district heating circuit which lies downstream, and the second medium pressure turbine is connected to the first heater of the district heating circuit.

Yet a further aspect includes that two low pressure turbines are provided in separate casings, that the two medium pressure turbines are connected on the outlet side in each case to one of the low pressure turbines, and that the low pressure turbines are adapted to the respective medium pressure turbine. As a result, two-stage condensing is also possible.

In a further variant, the two low pressure turbines can communicate with each other on the outlet side.

The low pressure turbines are optionally formed, in each case, in double-flow configuration.

Another aspect includes that a butterfly control valve is arranged in each case between the two medium pressure turbines and the associated low pressure turbines.

According to yet another aspect, a third medium pressure turbine is arranged between the high pressure turbine and the two medium pressure turbines, and is connected on the outlet side to the inlets of the first and second medium pressure turbines.

Another aspect of the present invention includes a power plant with cogeneration which is preferably equipped with such a steam turbine.

BRIEF DESCRIPTION OF THE DRAWINGS

The invention is to be subsequently explained in detail based on exemplary embodiments in conjunction with the drawing. The single FIGURE shows a much-simplified schematic diagram of a steam turbine with heating steam extraction according to an exemplary embodiment of the invention.

DETAILED DESCRIPTION OF EXEMPLARY EMBODIMENTS

In the FIGURE, a much simplified schematic diagram of a steam turbine with heating steam extraction, according to an exemplary embodiment of the invention, is reproduced. The steam turbine 10 altogether includes six turbine sections 11, 12, 15, 17, 19, and 20, which are coupled by a common shaft 28. Each of the six turbine sections has a separate turbine casing. In order to be able to control the high volumetric flows of heating steam, a 6-casing steam turbine is therefore used, which includes the following turbine sections:

one high pressure turbine, or HP turbine 11 three medium pressure turbines, or MP turbines 12, 15, and 17, and two low pressure turbines, or LP turbines 19, 20.

The high pressure turbine 11 obtains live steam from a steam generator (not shown) via a live steam inlet 13, which live steam is expanded to a medium pressure and then delivered via a reheater 14 to the inlet of the first medium pressure turbine 12. The steam which is waiting at the outlet of the first medium pressure turbine 12 is distributed to the two subsequent medium pressure turbines 15 and 17, which operate in parallel, and is further expanded there. The medium pressure turbine 17 customarily has more stages than the medium pressure turbine 15, so that its outlet pressure is lower. Steam is extracted accordingly from the medium pressure turbine 17 for a first heater 24 in a district heating circuit 27, while the steam for the subsequent second heater 21 in the series connection comes from the medium pressure turbine 15. In the district heating circuit 27, a suitable medium, for example water, is heated in the two heaters 21, 24 and, by a circulating pump 22, is pumped to a heat consumer 23 and from there back to the heaters 21, 24.

The steam which is not required for heating purposes is guided from the medium pressure turbines 15 and 17 via butterfly control valves 16 and 18, in each case, to a subsequent double-flow low pressure turbine 19 or 20, where it is expanded to the pressure level of the subsequent condenser 25 in the water/steam circuit and is finally pumped as condensate via a condensate outlet 26 to a feed water boiler (not shown). In a variant with two-stage condensing, two separate condensers are used.

The low pressure turbines 19, 20 are adapted to the different pressures at the outlet of the medium pressure turbines 15 and 17.

A conventional HP turbine is used as the HP turbine 11, which is suitable for supercritical steam pressures at very high temperatures. The MP turbine 12 is suitable for very high temperatures and expands the steam from reheater pressure to the pressure upstream of the MP turbines 15 and 17. The MP turbine 15 expands some of the steam which issues from the MP turbine 12 to the required pressure of the second district heating heater 21. The MP turbine 17 expands the remaining part of the steam which issues from the MP turbine 12 to the required pressure of the first district heating heater 24. The two LP turbines 19 and 20, which are charged in each case with the overflowing steam of the MP turbines 15 and 17, are provided with different absorption capability.

Butterfly control valves 16, 18 need to be arranged upstream of each LP turbine 19, 20, in order to be able to maintain the heating steam pressure if necessary.

The steam turbine 10 is preferably part of a power plant with cogeneration, wherein the steam turbine 10 operates in a closed water/steam cycle, which includes, among other things, a steam generator (with a superheater, if necessary), a feed water boiler, a feed water pump, a condenser, a condensate pump, and various heat exchangers.

It is particularly advantageous when the large volumetric flows can be controlled only by the use of the two double-flow MP heating turbines 15, 17 with large outlet branches which are connected to the district heating heaters 21 and 24.

List of Designations

| | |
|---|---|
| 10 | Steam turbine |
| 11 | High pressure turbine (HP turbine) |
| 12, 15, 17 | Medium pressure turbine (MP turbine) |
| 13 | Live steam inlet |
| 14 | Reheater |
| 16, 18 | Butterfly control valve |
| 19, 20 | Low pressure turbine (LP turbine) |
| 21, 24 | Heater |
| 22 | Circulating pump |
| 23 | Heat consumer |
| 25 | Condenser |
| 26 | Condensate outlet |
| 27 | District heating circuit |
| 28 | Shaft |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A steam turbine with heating steam extraction, the turbine comprising:
    a plurality of turbine sections configured and arranged for high pressure, medium pressure, and low pressure ranges;
    a common shaft;
    a plurality of casings;
    a district heating circuit including two series-connected heaters;
    wherein the turbine sections are each arranged in a separate casing and connected by the common shaft;
    wherein the plurality of turbine sections comprises one high pressure turbine having an outlet, at least two medium pressure turbines each having a casing and an outlet connected to one of the two series-connected heaters of the district heating circuit, and at least one low pressure turbine;
    wherein the casings of said medium pressure turbines are spatially separated;
    wherein the two medium pressure turbines are connected in parallel;
    wherein the at least one low pressure turbine comprises at least two low pressure turbines provided in separate casings;
    wherein the outlet of each of the at least two medium pressure turbines is connected to one of the at least two low pressure turbines; and
    wherein the at least two low pressure turbines are each adapted to the respective medium pressure turbine.

2. The steam turbine as claimed in claim 1, wherein each of the at least two medium pressure turbines comprises a double-flow turbine.

3. The steam turbine as claimed in claim 1, wherein the at least two medium pressure turbines each have an inlet in fluid communication with each other;
    wherein a first of the at least two medium pressure turbines is configured and arranged to expand steam to a first pressure;
    wherein a second of the at least two medium pressure turbines is configured and arranged to expand the steam to a second pressure which is lower than the first pressure;
    wherein the two series-connected heaters include a first heater and a second heater downstream of the first heater;
    wherein the first medium pressure turbine is connected to the second heater; and
    wherein the second medium pressure turbine is connected to the first heater.

4. The steam turbine as claimed in claim 1, wherein the at least two low pressure turbines each includes an outlet in fluid communication with each other.

5. The steam turbine as claimed in claim 1, wherein each of the at least two low pressure turbines comprises a double-flow turbine.

6. The steam turbine as claimed in claim 1, further comprising:
    a butterfly control valve arranged between each of the at least two medium pressure turbines and an associated low pressure turbine of the at least two low pressure turbines.

7. The steam turbine as claimed in claim 1, wherein the at least two medium pressure turbines comprises first and second medium pressure turbines each having inlets, and a third medium pressure turbine arranged between the high pressure turbine and the first and second medium pressure turbines, the third medium pressure turbine including an outlet connected to the inlets of the first and second medium pressure turbines.

8. A power plant comprising:
    a steam turbine as claimed in claim 1.

* * * * *